United States Patent

[11] 3,608,833

[72] Inventors Ronald A. Hankins
Fair Oaks;
Donald W. Culver, Fair Oaks; Harrison B. Scammon, Jr., Carmichael, all of Calif.
[21] Appl. No. 865,706
[22] Filed Oct. 13, 1969
[45] Patented Sept. 28, 1971
[73] Assignee Aerojet-General Corporation
El Monte, Calif.

[54] FLUID DISTRIBUTORS AND THRUSTERS
8 Claims, 7 Drawing Figs.
[52] U.S. Cl. .................................................. 239/553.3,
239/265.11, 239/430
[51] Int. Cl. ..................................................... B05b 1/14,
F23d 13/44
[50] Field of Search........................................... 239/553,
553.5, 555, 553.3, 265.11 X, 430 X

[56] References Cited
UNITED STATES PATENTS
2,713,894 7/1955 Sage ............................. 239/555
2,823,075 2/1958 Shirley ......................... 239/553.3 X Primary Examiner—Lloyd L. King
Attorneys—Edward O. Ansell and D. Gordon Angus ABSTRACT: According to the present disclosure, a fluid distributor comprises a stack of a plurality of wafers. Inlet apertures are provided through inlet wafers and are in fluid communication with distribution apertures in a distribution wafer. Outlet apertures are provided in fluid communication with the distribution wafers. Preferably, metering apertures and transfer apertures are provided in serial fluid communication with said distribution apertures between the inlet and outlet apertures. A thruster according to this disclosure may include a first fluid distributor for radially injecting monopropellant into a radial catalyst pack, or a second fluid distributor for axially injecting monopropellant into an axial catalyst pack.

INVENTORS,
RONALD A. HANKINS
DONALD W. CULVER
HARRISON B. SCAMMON, JR

BY D. Gordon Angus
ATTORNEY

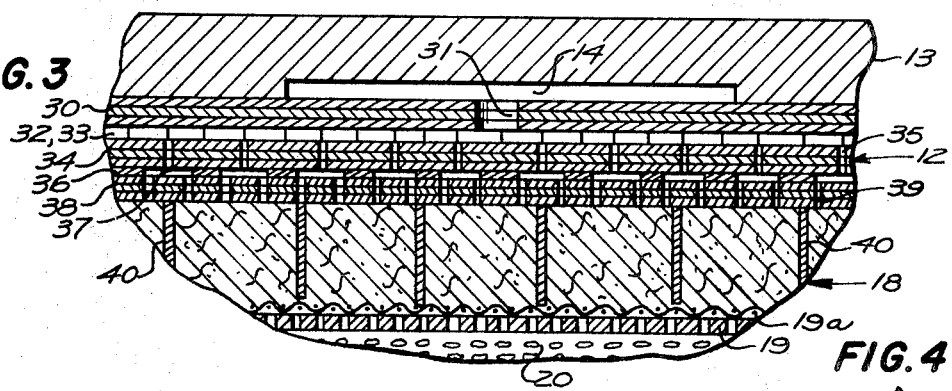
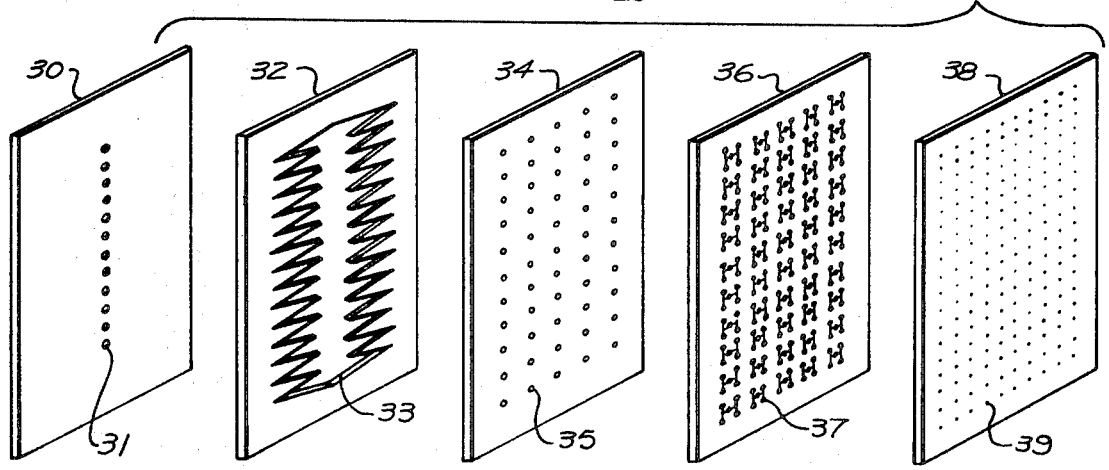
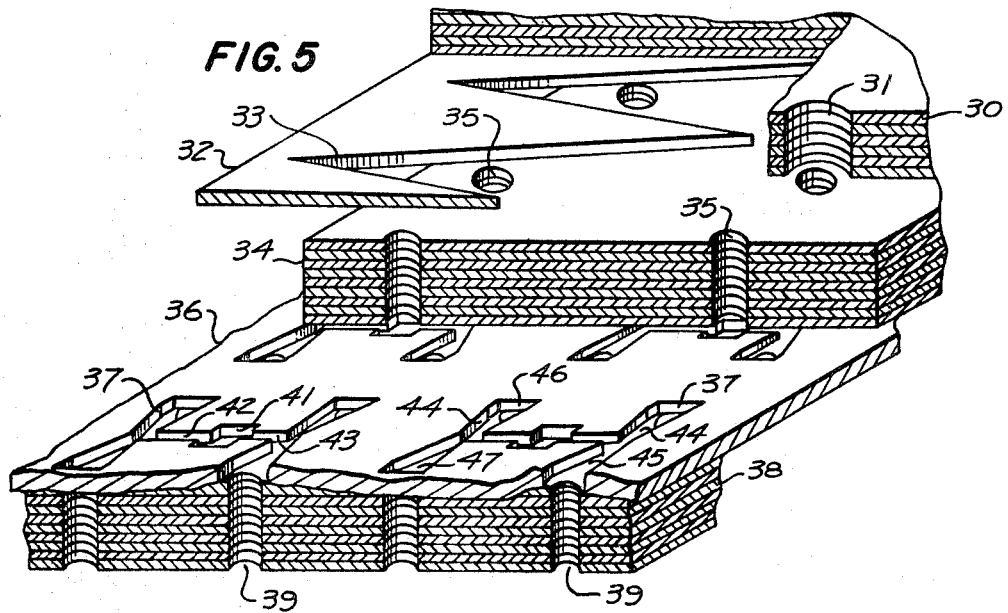

PATENTED SEP28 1971 3,608,833

INVENTORS,
RONALD A. HANKINS
DONALD W. CULVER
HARRISON B. SCAMMON, JR.
BY
D. Gordon Angus
ATTORNEY

FLUID DISTRIBUTORS AND THRUSTERS

This invention relates to fluid distributors, and particularly to fluid distributors for injecting monopropellant into thrusters.

Monopropellant thrusters utilize a catalyst pack capable of decomposing the monopropellant so that it may be expanded within a thrust chamber and expelled through a suitable throat or nozzle. One problem associated with such thrusters resides in the fact that for optimum operating characteristics, the monopropellant should be distributed into the catalyst pack at a predetermined velocity and pressure drop.

It is an object of the present invention to provide a fluid distributor capable of distributing fluid throughout a given area.

Another object of the present invention is to provide a thrust chamber with a fluid distributor capable of distributing monopropellant throughout a catalyst pack for decomposition in the thrust chamber.

In accordance with the present invention, a fluid distributor is provided which is constructed of a stack of a plurality of wafers each having opposite planer surfaces. The wafers are so disposed and arranged that a planar surface of each wafer is contiguous to a planar surface of an adjacent wafer. The stack includes a first wafer means having an inlet aperture therethrough providing fluid communication between opposite planar surfaces and a second wafer means having a plurality of outlet apertures therethrough. A third wafer provides a distribution aperture so shaped as to distribute fluid admitted in the inlet aperture in a predetermined ratio to each of the outlet apertures.

According to an optional and desirable feature of the present invention, another wafer having a metering aperture is provided so that the metering aperture is in serial fluid communication with the distribution apertures between the inlet and outlet apertures and another wafer means having transfer apertures provides fluid communication between the metering apertures and the distribution apertures.

According to another optional and desirable feature of the present invention, the fluid distributor may provide radial or axial fluid injection of monopropellant into a radial or axial catalyst pack in a thruster.

According to another optional and desirable feature of the present invention, the aperture configuration throughout the wafers in the stack forming the fluid distributor is of a repetitive design so that the stack may be made in sheets and cut to size without affecting the metering or distribution capabilities of the fluid distributor.

Another optional and desirable feature of the present invention resides in the flexibility of the stack of wafers so that the stack may be fashioned to any desirable geometric configuration.

Another optional and desirable feature of the present invention resides in a compartmented catalyst pack.

The above and other features of this invention can be more fully understood from the following detailed description and the accompanying drawings, in which:

FIG. 3 is an enlarged section view taken at line 3—3 in Fig. 2;

FIG. 4 is an exploded view of a fluid distributor in accordance with the presently preferred embodiment of the present invention;

FIG. 5 is a cutaway section view of a portion of the fluid distributor formed by the assembly of Fig. 4;

Figure 1:
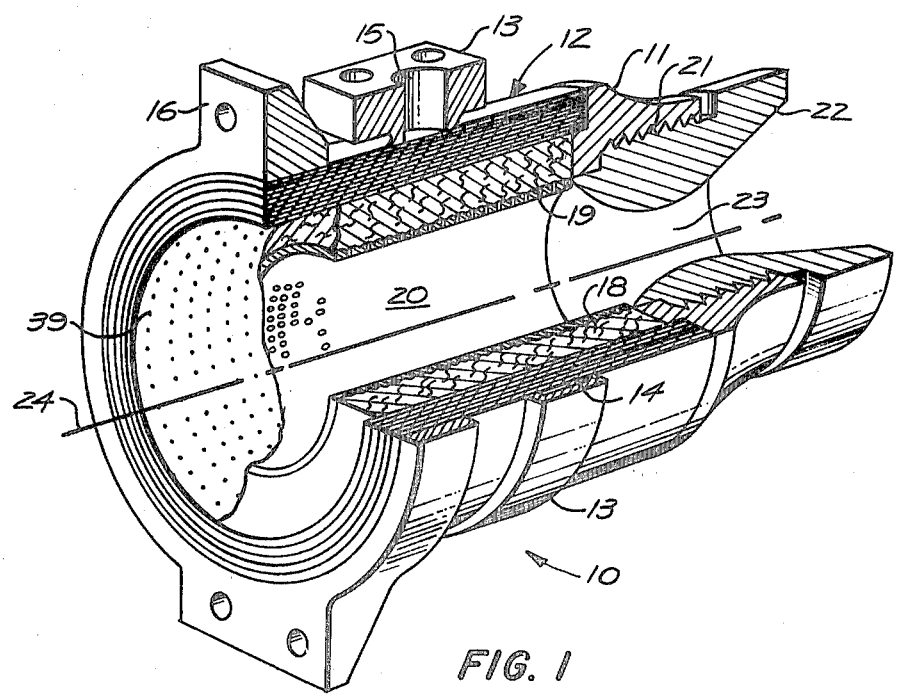
FIG. 1 is a partly cutaway perspective view of a thruster with an end removed therefrom in accordance with the presently preferred embodiment of the present invention.
Figure 2:
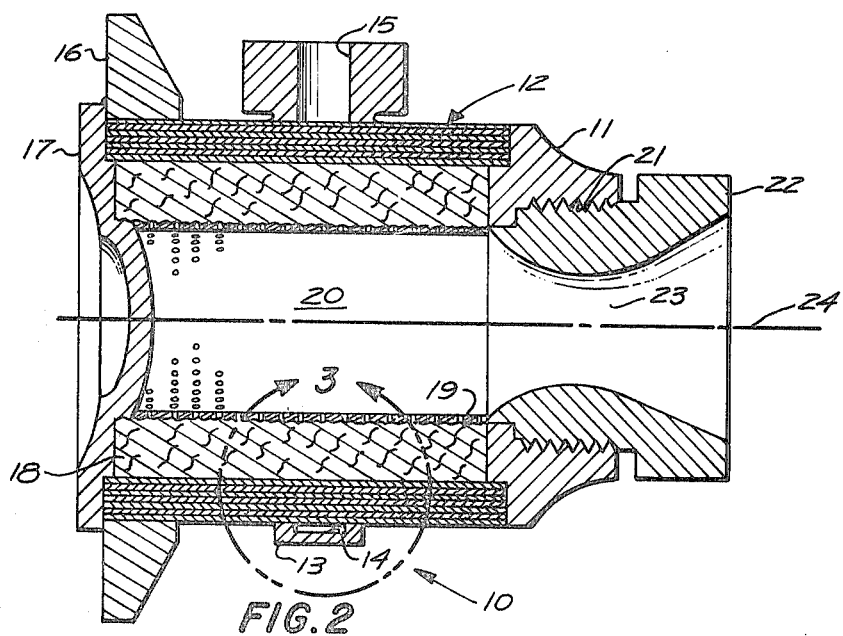
FIG. 2 is a side view elevation in cutaway cross section of the thruster illustrated in Fig. 1, but with the end in place.

Referring now to the drawings, and particularly to FIGS. 1 and 2, there is illustrated a thruster 10 in accordance with the presently preferred embodiment of the present invention.

Thruster 10 includes a housing 11 supporting one end of a stack 12 of substantially cylindrically disposed wafers. Annular collar 13 is supported by the outermost wafer of stack 12 and has an annular manifold passage 14 disposed therein. Inlet opening 15 is provided in collar 13 and forms a fluid inlet to manifold passage 14. Flange 16 is supported by the outer wafer of stack 12 and end plate 17 is fastened to flange 16 in a suitable manner, such as by welding, to support the end of stack 12 opposite from housing 11. As will be more fully understood hereinafter, end plate 17 may include an axial fluid distributor (more fully described in connection with Figs. 6 and 7) and an axial catalyst pack.

Cylindrical catalyst pack 18 is mounted within the stack 12 of wafers and is bounded by retainer 19 to form thrust chamber 20. Retainer 19 may be in the form of a perforated tube and may be bordered by screen 10a as shown in Fig. 3. Housing 11 includes threaded portion 21 to which nozzle 22 is threadably assembled. Nozzle 22 includes throat portion 23 which is located axially downstream from thrust chamber 20. Both thrust chamber 20 and nozzle 23 are centered on axis 24.

Stack of wafers 12 forms a fluid distributor between manifold passage 14 and the entrance to catalyst pack 18. The purpose of the fluid distributor formed by the stack of wafers is to evenly distribute and inject monopropellant into the catalyst pack at a metered rate so that the monopropellant is decomposed by the catalyst. The combustion gases formed by the decomposed monopropellant expands within thrust chamber 20 and is expelled through throat 23 to provide thrust to the unit.

The fluid distributor formed by the stack 12 of wafers is illustrated in greater detail in Figs. 3–5. In Figs. 3–5 there is illustrated a stack of wafers 12 comprising a plurality of inlet wafers 30 having inlet apertures 31 disposed therethrough and in fluid communication with manifold passage 14 of collar 13. Each wafer includes opposite planar surfaces which are contiguous to the planar surface of the next adjacent wafer. The planar surface of the innermost wafer 30 is contiguous to a planar surface of distribution wafer 32 having distribution apertures 33 disposed therethrough and in fluid communication with respective inlet passages 31. A stack of a plurality of transfer wafers 34 are provided having transfer apertures 35 disposed therethrough. One planar surface of the outermost transfer wafer 34 is contiguous to the opposite side of distribution wafer 32. Transfer apertures 35 provide fluid communication between respective distribution apertures 33 and respective metering appertures 37 in metering wafer 36. A stack of outlet wafers 38 is arranged so that one planar surface of one outlet wafer is contiguous to the opposite planar surface of metering wafer 36. Outlet wafers 38 contain a plurality of outlet apertures 39 disposed therethrough which provide fluid communication between catalyst pack 18 and respective metering passages 37. Outlet apertures 39 are preferably spaced approximately 0.100 inches apart. It is to be understood that any number of inlet wafers 30, transfer wafers 34 and outlet wafers 38 may be used in the design of a fluid distributor in accordance with the present invention.

As illustrated particularly in Fig. 5, metering apertures 37 are substantially H-shaped and include a center leg having an enlarged inlet portion 41 in fluid communication with apertures 35 of transfer wafers 34. Channels 42 and 43, which together form the center leg of the H-shaped aperture, provide fluid communication between inlet portion 41 and tapered channels 44 and 45 of each side leg portion of the aperture. Tapered portions 44 and 45 taper outwardly towards end portion 46 and 47, respectively. Portions 46 and 47 of each side leg of each H-shaped aperture 37 are in fluid communication with respective outlet apertures 39 in outlet wafer 38.

The wafers may be constructed of a suitable ductile metal, such as 300 series stainless steel and may have thicknesses between about 0.001 and 0.010 inches.

Preferably, the wafers are constructed from type 304 stainless steel.

The individual wafers may be formed in any one of several ways. One method which is well known to those skilled in the art utilizes the photoetching process wherein a thin metal sheet is imprinted with an acid-resistant ink or coating which outlines the flow passage voids and the external wafer shape. The sheet is then immersed in an acid bath which etches out the voids at a precisely known, precisely determined rate. Several different etch depths may be obtained on a single sheet by repeating the photoetching process, but for most purposes, the wafer is etched completely through on both sides.

The wafers are bonded together to provide structural integrity as well as to prevent leaks between the passages or to the environment. One method of bonding the wafers together is by diffusion bonding. Other methods which might be used include furnace brazing, resistence welding or advanced application of adhesive to the contacting wafer surfaces.

An injector for a thruster capable of providing a 600-pound thrust may have a fluid distributor in accordance with the present invention having a nominal fluid flow rate of about 2.7 lb./sec. causing a total pressure drop of 150 p.s.i. between the inlet and outlet orifices of the fluid distributor. The fluid distributor includes two inlet wafers 30 each having a thickness of 0.01 inches, one distribution wafer 32 having a thickness of 0.01 inch, 18 transfer wafers 34 having a thickness of 0.01 inch, 18 transfer wafers 34 having a thickness of 0.003 inches, and 13 outlet wafers having a thickness of 0.003 inches each. The total thickness of the stack is 0.126 inches. The stack is formed into a pair of half-cylindrical sections which are joined to form a cylindrical tube having a 3.75-inch outside diameter and being 4 inches long.

The inlet and distribution wafers distribute propellant to transfer wafers where it flows through the transfer apertures which have a total length of approximately 0.054 inches (18×0.003 inch). The velocity through the transfer apertures is approximately 6 ft./sec. The flow of monopropellant continues through the center portion 41 of a respective metering aperture 37 where the monopropellant flow turns 90° from the center and into each channel 42,43. The fluid flow velocity in portions 42 and 43 is approximately 100 ft./sec. The metering wafer channels control fluid distribution and flow velocity by causing a pressure drop in the fluid pressure. The pressure drop is principally due to the entrance opening to channels 42 and 43, within channels 42 and 43, and the turn at the exits of channels 42 and 43. In practice, the metering wafer causes approximately 80 percent of the total pressure drop in the fluid distributor. The monopropellant is directed through the four side legs, 44,45 of the substantially H-shaped passage at the end of which it makes another 90° turn and dumps into the outlet orifices 39 of the outlet wafers 38. The monopropellant is injected into the catalyst pack 18 through approximately 4,480 outlet orifices at a flow velocity of 3 ft./sec.

The catalyst pack comprises a suitable catalyst for decomposing the monopropellant. By way of example, a suitable catalyst for decomposing hydrazine, a monopropellant, is Shell 405 catalyst available from the Shell Development Company. Of course, other suitable catalysts for other monopropellants are well known to those skilled in the art.

Figure 6:
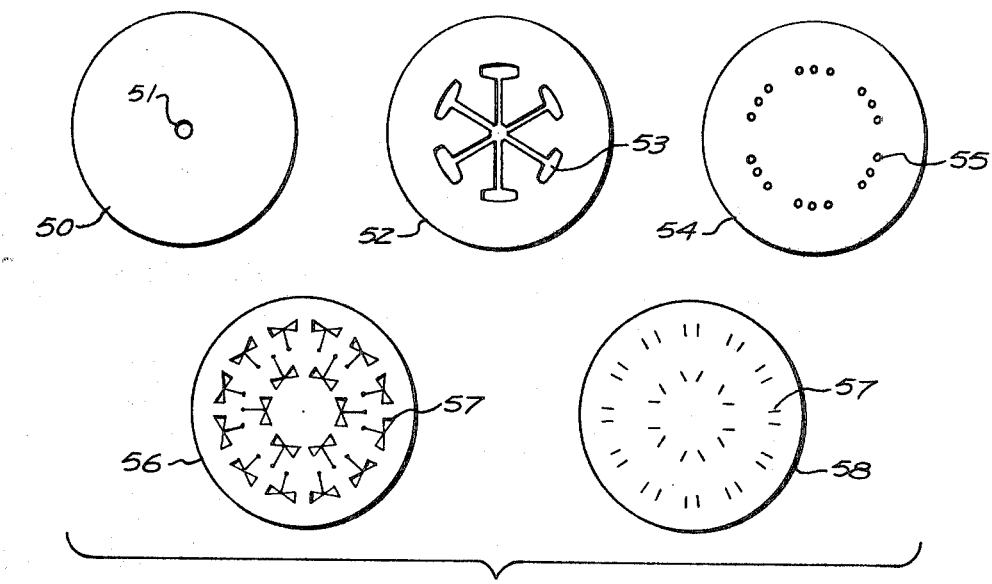
FIG. 6 is an exploded view of a fluid distributor in accordance with a modification of the present invention.
Figure 7:
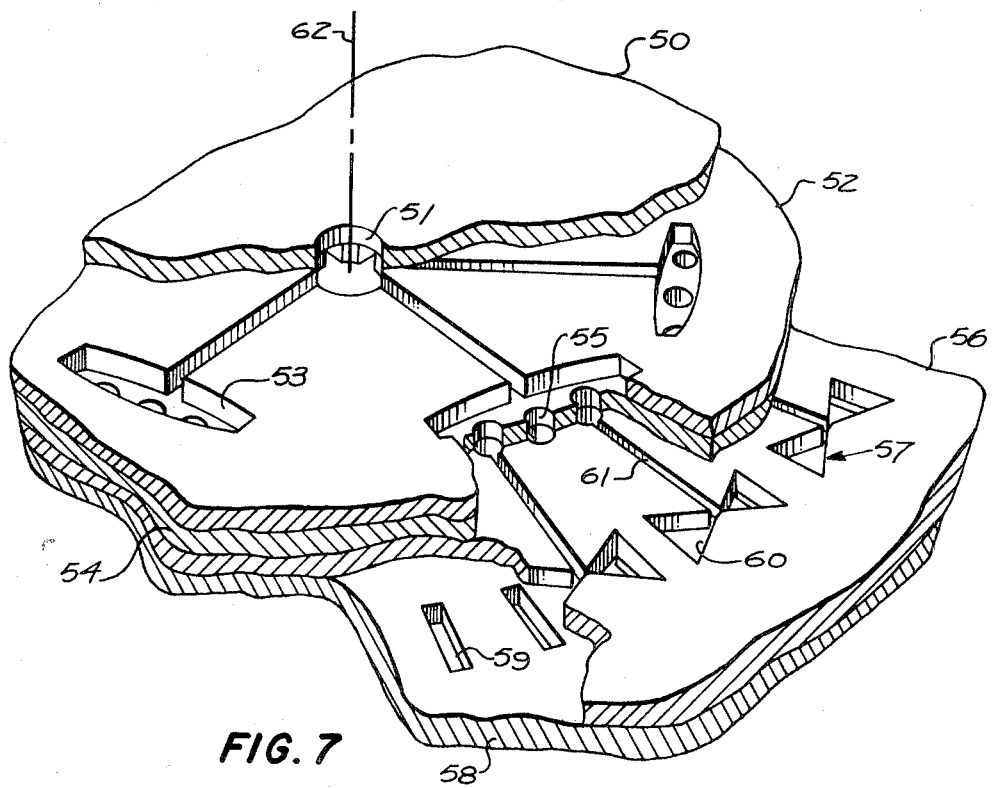
FIG. 7 is a cutaway section view of a portion of the fluid distributor formed by the assembly of Fig. 6.

Figs. 6 and 7 illustrate an axial flow distributor of the present invention for use in an axial flow thruster having a solid cylindrical wall; whereby the distributor is mounted in the end similar to the end wall 17 of the thruster illustrated in Figs. 1 and 2. The fluid distributor illustrated in Figs. 6 and 7 comprises an inlet wafer 50 having an inlet aperture 51 disposed therethrough. One planar surface of inlet wafer 50 is contiguous to a planar surface of distribution wafer 52 having distribution apertures 53 disposed therethrough and in communication with inlet aperture 51. The opposite planar surface of distribution wafer 52 is contiguous to a planar surface of transfer wafer 54 having transfer apertures 55 disposed therethrough and in fluid communication with respective distribution apertures 53. The opposite planar surface of a transfer wafer 54 is contiguous to a planar surface of metering wafer 56 having metering apertures 57 disposed therethrough and in fluid communication with respective ones of transfer apertures 55. The opposite planar surface of metering wafer 56 is contiguous to a planar surface of outlet wafer 58 having a plurality of outlet apertures 59 in fluid communication with respective metering apertures 57 of metering wafer 56.

As illustrated particularly in Fig. 7, metering apertures 57 comprises substantially triangular apertures 60 which are joined together and to passage 61 which in turn is in fluid communication with transfer apertures 55 of transfer wafers 54. As in the embodiments illustrated in Figs. 3 through 5, the number of inlet wafers 50, the number of transfer wafers 54, and the number of outlet wafers 58 may be varied in accordance with particular design requirements.

In operation of the axial fluid distributor illustrated in Figs. 6 and 7, fluid is admitted axially through aperture 51 along axis 62 and is distributed via distribution apertures 53 through transfer apertures 55 and into the channels 61 of metering apertures 57. The fluid makes a 90° turn at the entrance to channels 61 and thence are divided into two flows to triangular shaped portions 60 of metering aperture 57. The flow then makes another 90° turn into outlet apertures 59 and is expelled into a suitable catalyst pack (not shown). Like the embodiment illustrated in Figs. 3 through 5, most of the pressure drop of monopropellant flowing through the fluid distributor illustrated in Figs. 6 and 7 occurs in metering apertures 57. Hence, the pressure drop caused by the 90° turn into channel 61 of the metering aperture, the pressure drop within channel 61 of the metering aperture, and the pressure drop caused by the 90° turn into the triangular apertures 60 account for approximately 80 percent of the total pressure drop within the fluid distributor system.

Another feature of the present invention resides in the use of ring baffles 40 in catalyst pack 18 as illustrated in Fig. 3. Hence, the baffles 40 divide the catalyst pack into several compartments so that flow of monopropellant is divided through the compartments of the catalyst pack and the catalyst material does not tend to conglomerate or "pack up" in any particular region of the pack. Hence, the compartmentation of the catalyst pack prolongs the life of the catalyst pack.

The present invention thus provides a fluid distributor which has a repetitive design so that it may be fabricated in substantially large sheets and cut to smaller sizes for particular applications. When used as an injector for a thruster, a fluid distributor according to this invention provides an effective distribution mechanism for distributing monopropellant to a catalyst pack of such thruster. The thruster according to the present invention is provided with radial and/or an axial injection provided by the fluid distributor and catalyst pack and is effective in operation ans small in size.

This invention is not to be limited by the embodiments shown in the drawings, and described in the description, which are given by way of example and not of limitation.

What is claimed is:

1. A fluid distributor comprising a stack of a plurality of wafers each having opposite planar surfaces, said wafers being so disposed and arranged that a planar surface of each wafer is contiguous to a planar surface of an adjacent wafer, said stack of wafers including first wafer means having an inlet aperture therethrough providing fluid communication between opposite planar surfaces thereof, second wafer means having a plurality of outlet apertures therethrough providing fluid communication between opposite planar surfaces thereof, third wafer means having a distribution aperture therethrough providing fluid communication between opposite planar surfaces, said distribution aperture providing fluid communication between said inlet aperture and said plurality of outlet apertures and being so shaped as to distribute fluid admitted in said inlet aperture in a predetermined ratio to each of said outlet apertures.

2. Apparatus according to claim 1 wherein said stack further includes fourth wafer means having a metering aperture therethrough providing fluid communication between opposite planar surfaces thereof, said metering aperture being in serial fluid communication with said distribution aperture between said inlet aperture and said plurality of outlet apertures, said metering aperture being adapted to meter flow of fluid between said inlet and outlet apertures in a predetermined manner.

3. Apparatus according to claim 2 wherein said stack of wafers further includes fifth wafer means having a transfer aperture therethrough providing fluid communication between said distribution aperture and said metering aperture.

4. Apparatus according to claim 3 wherein said third wafer means has a thickness of about 0.010 inches and said fourth wafer means has a thickness of about 0.003 inches.

5. Apparatus according to claim 1 wherein said stack further includes fourth wafer means having a metering aperture therethrough providing fluid communication between opposite planar surfaces thereof, and fifth wafer means having a transfer aperture therethrough providing fluid communication between opposite planar surfaces thereof, one planar surface of said third wafer means being contiguous to a planar surface of said first wafer means and the opposite planar surface of said third wafer means being contiguous to a planar surface of said fifth wafer means, and one planar surface of said fourth wafer means being contiguous to the opposite planar surface of said fifth wafer means and the opposite planar surface of said fourth wafer means being contiguous to a planar surface of said second wafer means, whereby fluid admitted through said inlet aperture flows serially through said distribution aperture, said transfer aperture, said metering aperture and said outlet apertures, said metering aperture being so sized and arranged as to meter flow of fluid therethrough in a predetermined manner.

6. Apparatus according to claim 5 wherein said third wafer means has a thickness of about 0.010 inches and said fourth wafer has a thickness of about 0.003 inches.

7. A fluid distributor comprising a stack of a plurality of discrete wafers each having opposite planar surfaces, said wafers being so disposed and arranged that a planar surface of each wafer is contiguous to a planar surface of an adjacent wafer; distributor aperture means providing fluid communication between opposite planar surfaces of one of said wafers; inlet aperture means providing fluid communication between opposite planar surfaces of a wafer of said stack having a planar surface contiguous to a planar surface of said one wafer, said inlet aperture means being in fluid communication with said distribution aperture means; and a plurality of outlet apertures providing fluid communication between opposite planar surfaces of a wager of said stack having a planar surface contiguous to a planar surface of said one wafer, said outlet apertures being in fluid communication with said distribution aperture means, the thickness of said one wafer and the size and shape of said distribution aperture means being so disposed and arranged as to distribute fluid admitted through said inlet aperture means in a predetermined manner to said outlet apertures.

8. A fluid distributor according to claim 7 wherein the thickness of said one wafer is about 0.010 inches.